United States Patent
Clores et al.

(10) Patent No.: US 11,529,768 B2
(45) Date of Patent: Dec. 20, 2022

(54) BABY BOTTLE NIPPLE AND METHOD OF FORMING AN OPENING THEREIN

(71) Applicants: Edgardo Clores, Las Vegas, NV (US); John C. Hanson, Las Vegas, NV (US)

(72) Inventors: Edgardo Clores, Las Vegas, NV (US); John C. Hanson, Las Vegas, NV (US)

(73) Assignee: Mace Corporation, Las Vegas, NV (US)

( * ) Notice: Subject to any disclaimer, the term of this patent is extended or adjusted under 35 U.S.C. 154(b) by 45 days.

(21) Appl. No.: 15/581,241

(22) Filed: Apr. 28, 2017

(65) Prior Publication Data

US 2018/0311911 A1  Nov. 1, 2018

(51) Int. Cl.
| | |
|---|---|
| *B29C 69/00* | (2006.01) |
| *A61J 11/02* | (2006.01) |
| *A61J 11/00* | (2006.01) |
| *B29D 99/00* | (2010.01) |
| *B29L 31/56* | (2006.01) |

(52) U.S. Cl.
CPC ......... *B29C 69/001* (2013.01); *A61J 11/0035* (2013.01); *A61J 11/02* (2013.01); *B29D 99/0096* (2013.01); *B29L 2031/56* (2013.01)

(58) Field of Classification Search
CPC ...... A61J 11/001; A61J 11/02; A61J 11/0015; A61J 11/002
See application file for complete search history.

(56) References Cited

U.S. PATENT DOCUMENTS

| 1,650,966 | A | * | 11/1927 | Smith | B65D 47/2031 |
| | | | | | 222/490 |
| 6,818,162 | B1 | * | 11/2004 | Hoffman | A61J 11/001 |
| | | | | | 156/155 |
| 2007/0131637 | A1 | * | 6/2007 | Tamura | A61J 11/004 |
| | | | | | 215/11.1 |
| 2007/0221604 | A1 | * | 9/2007 | Hakim | A61J 11/0015 |
| | | | | | 215/11.4 |

OTHER PUBLICATIONS

Netmums, Piercing Holes in Teats, Sep. 19, 2011, Netmums, https://www.netmums.com/coffeehouse/drop-clinic-984/bottle-feeding-559/637788-piercing-holes-teats.html, Accessed Mar. 8, 2019 (Year: 2011).*
Babycenter, Cutting bottle nipple, 2011 (accessed Mar. 20, 2020), p. 2/5, https://community.babycenter.com/post/a30641401/cutting bottle nipple (Year: 2011).*
Maddie's Fund Education, Orphaned Kitten Care: How to Videos—How to Bottle Feed an Orphaned Kitten, Apr. 11, 2013, https://www.youtube.com/watch?v=QXIaoLfEXjY, minute mark 1:30 (Year: 2013).*
Megabattie, Making perfect holes in teats first time, every time, May 16, 2012 (accessed Jun. 17, 2022), Youtube, https://www.youtube.com/watch?v=tJm20tpRFMc (Year: 2012).*

\* cited by examiner

*Primary Examiner* — Matthew J Daniels
*Assistant Examiner* — Andrew L Swanson
(74) *Attorney, Agent, or Firm* — Jeffrey D. Moy; Weiss & Moy, PC

(57) ABSTRACT

A method of forming a nipple for a baby bottle, comprises: forming a lower conical wall section; forming a higher conical wall section molded above the lower conical wall section; preventing deformation of the higher conical wall section; and cutting an opening through the higher conical wall section into an interior section of the nipple.

8 Claims, 5 Drawing Sheets

BABY BOTTLE NIPPLE AND METHOD OF FORMING AN OPENING THEREIN

TECHNICAL FIELD

This disclosure generally relates to a baby bottle nipple, and more particularly, to a baby bottle nipple having a leak resistant opening and a method of forming the leak resistant opening.

BACKGROUND

A baby bottle nipple may allow a baby or infant to drink liquids. These liquids may include formula, breast milk, water, or other fluid. A number of nipples currently exist in the market. Orthodontic nipples, for example, may provide a flattened look while angled nipples may be slanted to tilt into a baby's mouth. Vented nipples may include a tiny hole to allow air to flow while liquid is taken out.

Unfortunately, these nipples have drawbacks. Liquids may accidentally be released when, for example, a bottle having the nipple is tipped or dropped. The nipples may also release liquid when a baby is not sucking which may lead to choking.

Therefore, it would be desirable to provide a system and method that overcomes the above. The present disclosure provides a baby bottle nipple and configurations thereof that solves each of the described concerns. Other benefits and advantages will become clear from the disclosure provided herein and those advantages provided above are for illustration.

SUMMARY

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a method of forming a nipple for a baby bottle is provided. The method comprises: forming a lower conical wall section; forming a higher conical wall section molded above the lower conical wall section; preventing deformation of the higher conical wall section; and cutting an opening through the higher conical wall section into an interior section of the nipple.

In accordance with another aspect of the present disclosure, a method of forming a nipple for a baby bottle is disclosed. The method comprises: forming a lower conical wall section; forming a higher conical wall section molded above the lower conical wall section, wherein forming a higher conical wall section comprises: forming a cylinder extending upwards from the lower conical wall section; and forming a dome extending upwards from the cylinder; preventing deformation of the dome; and cutting an opening through the higher conical wall section into an interior section of the nipple while preventing deformation of the dome.

In accordance with yet another aspect of the present disclosure, a method of forming a nipple for a baby bottle is disclosed. The method comprises: forming a lower conical wall section; forming a higher conical wall section molded above the lower conical wall section; forming a base extending down from the lower conical wall section; preventing deformation of the higher conical wall section; and forming an opening through the higher conical wall section into an interior section of the nipple while preventing deformation of the higher conical wall section.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

Figure 1:
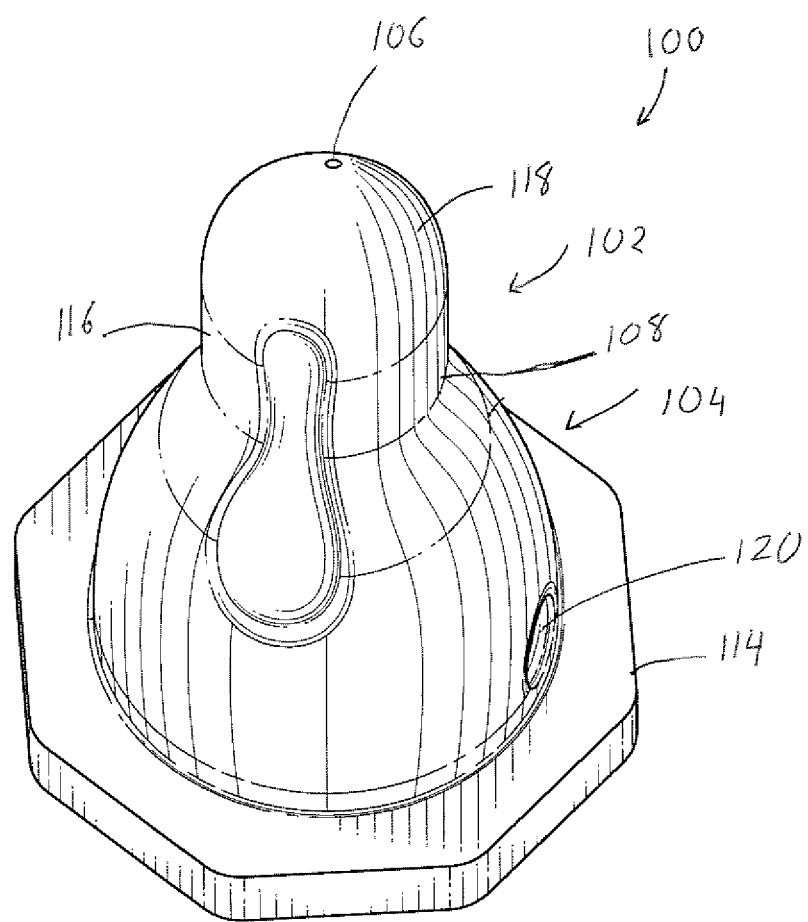
FIG. 1 is a top perspective view of an exemplary nipple in accordance with one aspect of the present disclosure.
Figure 2:
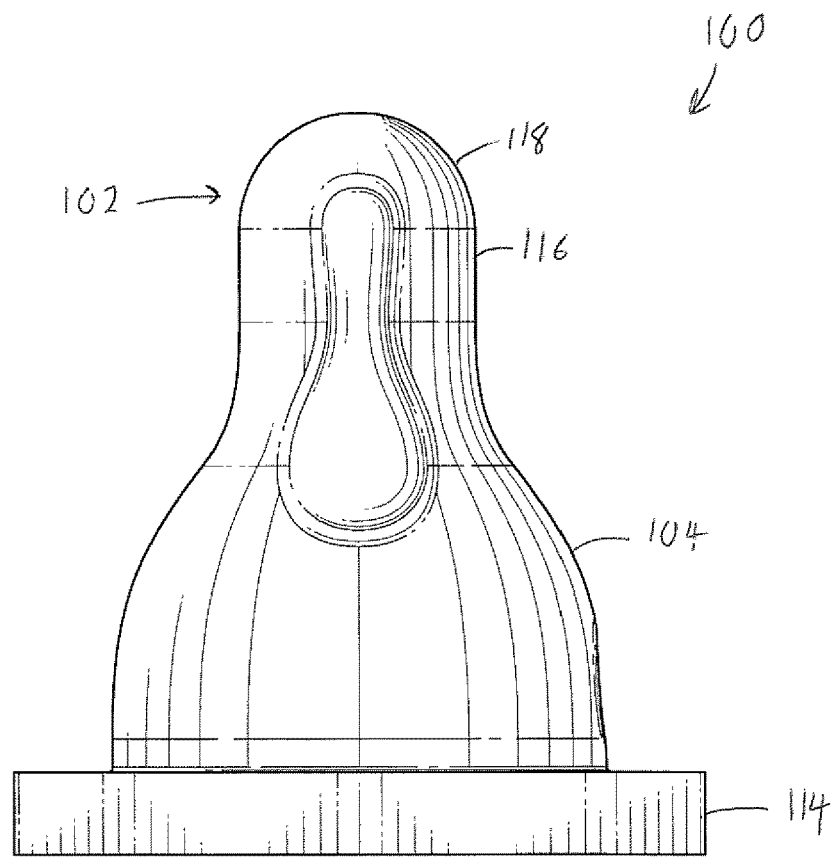
FIG. 2 is a front view of the exemplary nipple in accordance with one aspect of the present disclosure.
Figure 3:
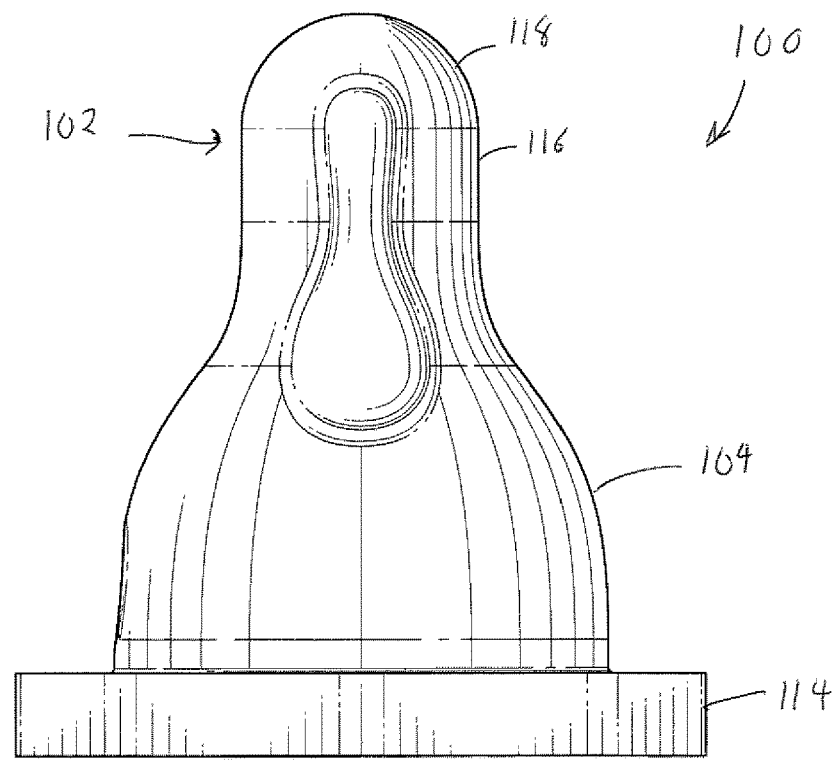
FIG. 3 is a rear view of the exemplary nipple in accordance with one aspect of the present disclosure.
Figure 4:
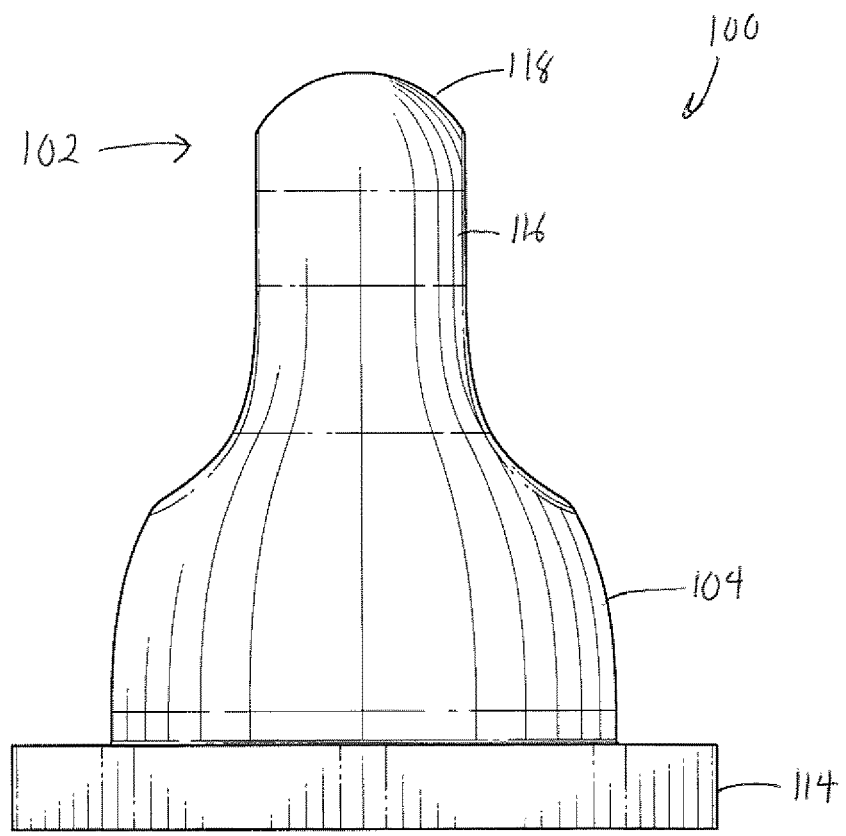
FIG. 4 is a left side view of the exemplary nipple in accordance with one aspect of the present disclosure.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

The present disclosure relates to a baby bottle nipple and provides multiple configurations to that system. More particularly, this disclosure describes a nipple for reducing or preventing the amount of liquid released due to accidental spillage when a baby is not feeding. In one illustrative embodiment, an opening in the nipple may be formed in a manner that reduces the burrs and/or roughness on the walls through which the opening may be formed. By reducing the amount of burrs and/or the roughness on the walls through which the opening may be formed a firmer seal may be formed between the walls thereby reducing or preventing the amount of liquid released due to accidental spillage when a baby is not feeding.

Numerous other modifications or configurations for the baby bottle nipple will become apparent from the description provided below. Advantageously, the structure of the nipple may reduce the amount of leakage when a baby is not feeding. Turning to FIGS. 1-8, an exemplary nipple 100 in accordance with one aspect of the present disclosure is provided. The nipple 100 may be part of a baby bottle assembly (not shown).

The nipple 100 may include a higher conical wall section 102, a lower conical wall section 104, and an opening 106 at the top of nipple 100. The higher conical wall section 102 and the lower conical wall section 104 may meet at a neck region 108. The higher conical wall section 102 may be molded above the lower conical wall section 104. Together, the higher conical wall section 102 and the lower conical wall section 104 may form a wall section having an interior chamber 110. The opening 106 may be in communication with the interior chamber 110.

A base portion 114 may extend down from the lower conical wall section 104 of the nipple 100. The base portion 114 of the nipple 100 may fit into a collar (not shown) for securing the nipple 100 to a bottle (not shown). The nipple 100 may be pushed through a bottom portion of the collar such that the base portion 114 rest within an interior section of the collar to secure the nipple 100 into place.

The nipple 100, having the higher conical wall section 102, lower conical wall section 104, base portion 114 and opening 106 at the top may be made of a single piece of elastic material, or multiple pieces of material molded together.

Extending from the lower conical wall section 104, at the neck region 108, may be the higher conical wall section 102. The higher conical wall section 102 may be made of a cylinder 116 and a dome 118. The cylinder 116 of the higher conical wall section 102 may extend directly upwards from the neck region 108. The dome 118, extending from the cylinder 204, may include the opening 106.

Figure 5:
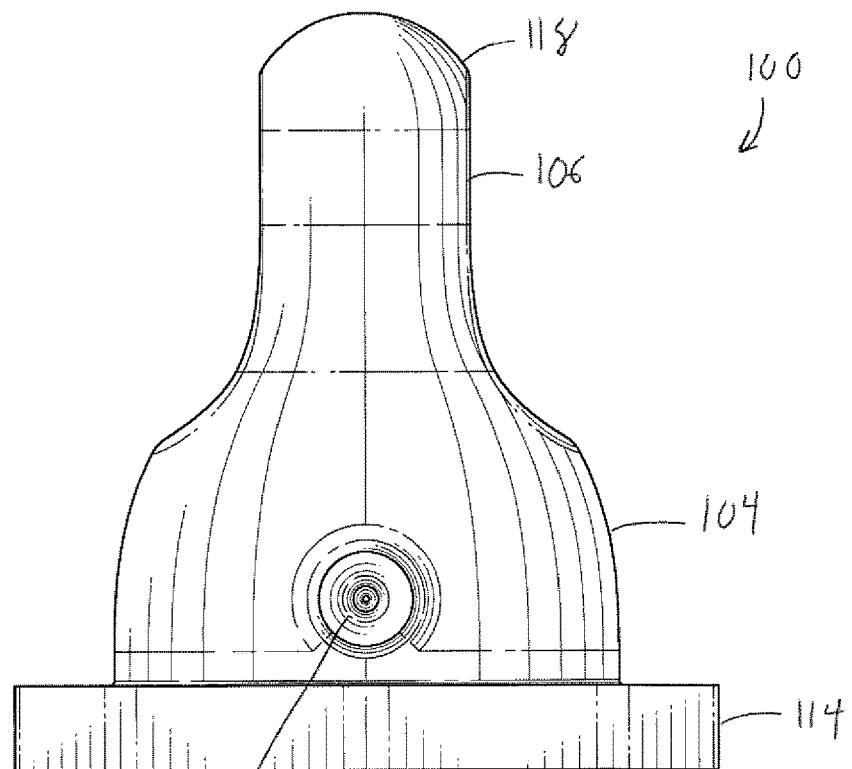
FIG. 5 is a right side view of the exemplary nipple in accordance with one aspect of the present disclosure.
Figure 6:
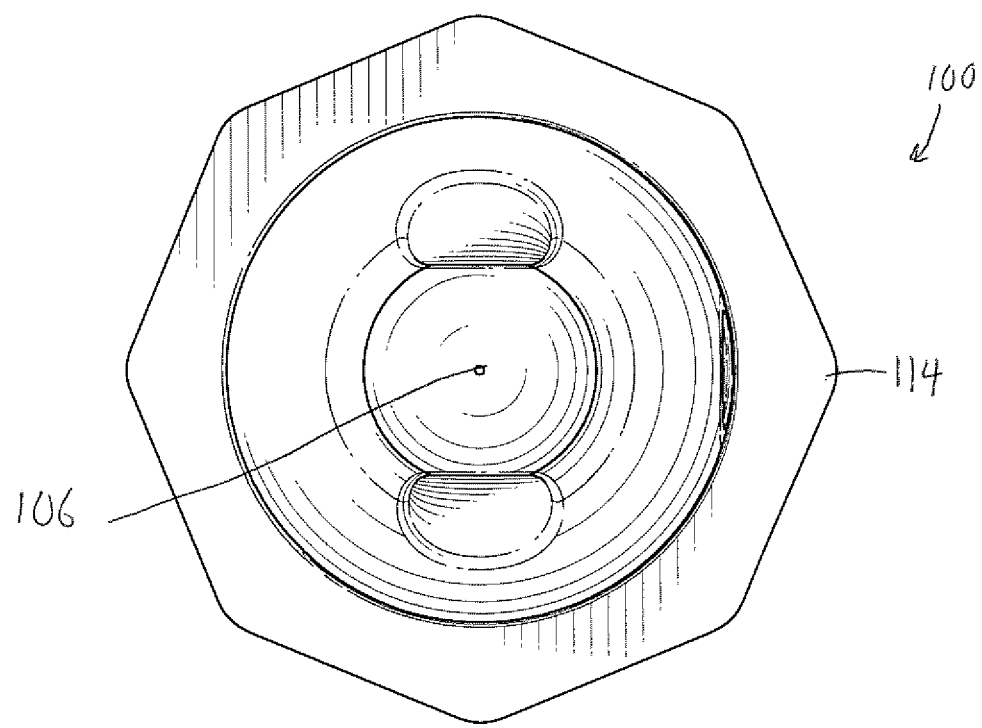
FIG. 6 is a top view of the exemplary nipple in accordance with one aspect of the present disclosure.
Figure 7:
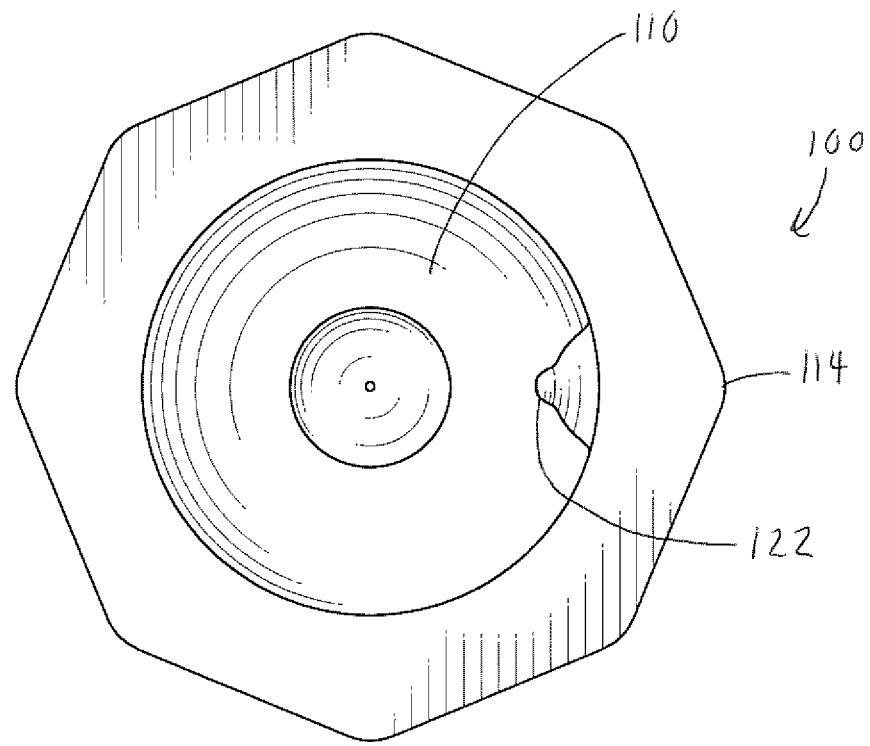
FIG. 7 is a bottom view of the exemplary nipple in accordance with one aspect of the present disclosure.
Figure 8:
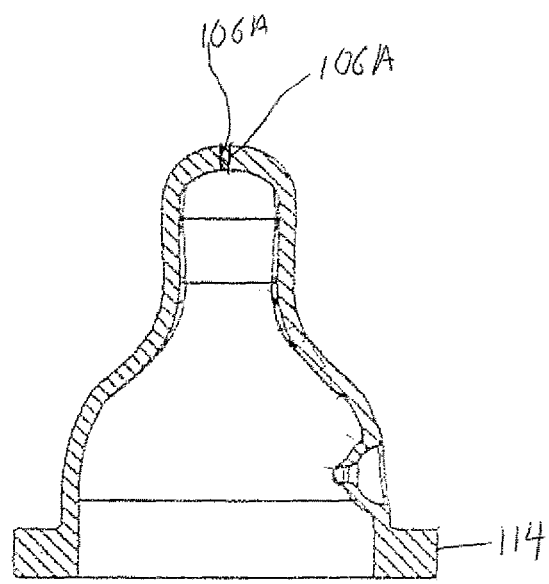
FIG. 8 is a cross-sectional side view of the exemplary nipple in accordance with one aspect of the present disclosure.

As may be seen more clearly in FIG. 5, a vent hole 120 may be formed in the lower conical wall section 104. The vent hole 120 may extend into the interior chamber 110 of the nipple 100. The vent hole 120 may allow air to enter the nipple 100 when in use to allow a liquid to flow more smoothly through the nipple 100 and out of the opening 106. The vent hole 120 may be a one way vent hole 120. This may allow air to enter interior chamber of the nipple 100 when one is sucking on the nipple 100.

In accordance with one embodiment, the vent hole 120 may extend partially into the interior chamber 110 of the nipple 100. While the vent hole 120 may extend partially into the interior chamber 110 of the nipple 100, the vent hole 120 may be configured to not impede the flow of a liquid out of the opening 106. The vent hole 120 may be conical in shape. A flap 122 may be formed at the end of the vent hole 120. The flap 122 may be designed to allow air to enter the nipple 100 when in use to allow a liquid to flow more smoothly through the nipple 100 and out of the opening 106 but closes the vent hole when one is not sucking on the nipple 100 thereby preventing any leakage of a liquid out of the vent hole 120.

When a baby is ready to feed, an applied pressure differential may be made when the baby begins to suck on the nipple 100. The applied pressure may cause the vent hole 120 to open thereby allow outside air to enter the interior chamber 110 of the nipple 100. The applied pressure may cause the opening 106 to open there by allowing the liquid from a bottle to flow to the baby. When the sucking action of the baby ceases, the vent hole 120 and the opening 106 may close thereby preventing the liquid from the bottle from leaking out of the vent hole 120 and the opening 106

The opening 106 may be configured to reduce any leakage out of the opening 106 when pressure is not applied to the nipple 100. The opening 106 may be formed to reduce the burrs and/or roughness on the walls 106A through which the opening 106 may be formed. By reducing the amount of burrs and/or the roughness on the walls 106A through which the opening 106 is formed, the walls 106A may bond together tighter thereby forming a firmer seal between the walls 106A. The firmer seal may reduce and/or prevent the amount of liquid released due to accidental spillage when a baby is not feeding.

In accordance with one embodiment, the opening 106 may be formed in the following manner. In order to reduce the burrs and/or the roughness on the walls 106A, when forming the opening 106, one should limit the amount of disfiguration in the area of the nipple 100 where the opening 106 may be formed. When cutting and/or puncturing the nipple 100 to form the opening 106, the pressure applied by a cutting tool forming the opening 106 may tend to deform the area where the opening 106 may be formed. The deformation of the nipple 100 may be the nipple 100 being depressed inwards by the force of the cutting tool. The deformation may cause resistance to the cut, thereby causing a non-smooth cut of the opening 106. The non-smooth cut may cause burrs and/or a rough surface to be formed on the walls 106A of the opening 106. The burrs and/or rough surface on the walls 106A may cause the walls 106A to form a loser seal which may have a tendency to leak. A smoother cut of the opening 106 with less burrs and/or a smoother surface on the walls 106A may allow the walls 106A to bond together tighter thereby forming a firmer seal between the walls 106A. The firmer seal may reduce and/or prevent the amount of liquid released due to accidental spillage when a baby is not feeding.

One may prevent the disfiguration in the area of the nipple 100 where the opening 106 may be formed in different manners. In accordance with one embodiment, the area of the nipple 100 where the opening 106 may be formed may be compressed together. For example, the dome 118 may be compressed together. By compressing the dome 118 together, one may limit the amount that the dome 118 may be depressed inwards by the cutting tool. This may limit the disfiguration in the area of the nipple 100 where the opening 106 may be formed thereby allowing for a smoother cut of the opening 106. In accordance with one embodiment, the area of the nipple 100 where the opening 106 may be formed may be compressed together using plates or similar items to compress and squeeze the area together.

Once the dome 118 may be compressed together, the cutting tool may cut and/or puncture the dome 118 to form the opening 106. In accordance with one embodiment, a diamond blade may be used to cut the dome 118 to form the opening 106. The more the dome 118 may be compressed together, the less the amount of disfiguration of the dome 118 during the formation of the opening 106 and hence the smoother the cut and the smoother the walls 106A.

Alternatively, in accordance with one embodiment, the area of the nipple 100 where the opening 106 may be formed may be stretched and/or held in form. For example, the dome 118 may be stretched out and/or held in form. By stretching and/or holding in form the dome 118, one may limit the amount that the dome 118 may be depressed inwards by the cutting tool. This may limit the disfiguration in the area of the nipple 100 where the opening 106 may be formed thereby allowing for a smoother cut of the opening 106. In accordance with one embodiment, the nipple 100 may be placed over a mold or similar object. This may prevent the nipple 100 from being disfigured during the cutting process.

Once the dome 118 may be stretched out and/or held in form, the cutting tool may cut and/or puncture the dome 118 to form the opening 106. The more the dome 118 may be stretched out and/or held in form, the less the disfiguration of dome 118 during the formation of the opening 106 and hence the smoother the cut and the smoother the walls 106A.

Alternatively, in accordance with one embodiment, the area of the nipple 100 where the opening 106 may be formed may be stretched and/or held in form and compressed together. For example, the dome 118 may be stretched out and/or held in form by a mold and then compressed together. By stretching and/or holding in form the dome 118 and compressing the dome 118 together, one may limit the amount that the dome 118 may be depressed inwards by the cutting tool. This may limit the disfiguration in the area of the nipple 100 where the opening 106 may be formed thereby allowing for a smoother cut of the opening 106.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method of forming a nipple for a baby bottle, comprising:
   forming a lower conical wall section;
   forming a higher conical wall section molded above the lower conical wall section, wherein the lower conical wall section and the higher conical wall section form an interior chamber;
   forming a vent device in the lower conical wall section, the vent device extending into the interior chamber;
   stretching the higher conical wall section by placing the higher conical wall section over a mold;
   compressing the higher conical wall section against the mold, wherein a pair of plate members compress the higher conical wall sections against the mold so that walls of the interior chamber are compressed against the mold preventing a top section of the higher conical wall section from entering the interior chamber when cutting an opening through the higher conical wall section; and
   inserting a diamond blade through the top section of the higher conical wall section into the interior chamber while the higher conical wall section is stretched and compressed forming the opening, wherein stretching and compressing the higher conical wall limits the top section of the higher conical wall section from indenting inwards into the interior chamber when forming the opening.

2. The method of claim 1, wherein forming a higher conical wall section comprises:
   forming a cylinder extending upwards from the lower conical wall section; and
   forming a dome extending upwards from the cylinder a top of the dome forming the top section;
   wherein compressing the higher conical wall together limits the dome from indenting inwards into the interior chamber when forming the opening.

3. The method of claim 2, wherein compressing the higher conical wall section comprises compressing the dome.

4. The method of claim 1, comprises forming a base extending down from the lower conical wall section.

5. A method of forming a nipple for a baby bottle, comprising:
   forming a lower conical wall section;
   forming a higher conical wall section molded above the lower conical wall section, wherein the lower conical wall section and the higher conical wall section form an interior chamber, wherein forming a higher conical wall section comprises:
      forming a cylinder extending upwards from the lower conical wall section; and
      forming a dome extending upwards from the cylinder;
   forming a vent device in the lower conical wall section, the vent device extending into the interior chamber;
   stretching the entire dome by placing the entire dome over a mold;
   compressing the dome together, wherein a pair of plate members compress the dome on the mold so that walls of the interior chamber are compressed against the mold preventing a top section of the dome from entering the interior chamber; and
   inserting a diamond blade through the top section of the dome and into the interior chamber while stretching and compressing the dome to form an opening through the top section of the dome, wherein stretching and compressing the dome limits the dome from indenting inwards towards the interior chamber when inserting the blade through the top section of the dome to form the opening.

6. The method of claim 5, comprises forming a base extending down from the lower conical wall section.

7. A method of forming a nipple for a baby bottle, comprising:
   forming a lower conical wall section;
   forming a higher conical wall section molded above the lower conical wall section, wherein the lower conical wall section and the higher conical wall section form an interior chamber;
   forming a base extending down from the lower conical wall section;
   forming a vent device in the lower conical wall section, the vent device extending into the interior chamber; and
   forming an opening through the higher conical wall section into the interior chamber by inserting a diamond blade through a top section of the higher conical wall section while stretching the higher conical wall section over a mold and compressing the higher conical wall section together on the mold, wherein a pair of plate members compress the higher conical wall section on the mold so that walls of the interior chamber are compressed against the mold preventing the top section of the higher conical wall section from entering the interior chamber, wherein stretching and compressing the higher conical wall section limits the higher conical wall section from indenting inwards towards the interior chamber when inserting the blade through the top section of the higher conical wall section.

8. The method of claim 7, wherein forming a higher conical wall section comprises:
   forming a cylinder extending upwards from the lower conical wall section; and
   forming a dome extending upwards from the cylinder a top of the dome forming the top section.

* * * * *